United States Patent
Klein

(10) Patent No.: US 8,116,777 B2
(45) Date of Patent: Feb. 14, 2012

(54) METHOD AND ARRANGEMENT FOR DETERMINING AT LEAST ONE SUGGESTION FOR A CHANGE OF LOCATION FOR A USER OF A MOBILE TERMINAL

(75) Inventor: Cornel Klein, Oberhaching (DE)

(73) Assignee: Siemens Enterprise Communications GmbH & Co. KG, Munich (DE)

(*) Notice: Subject to any disclaimer, the term of this patent is extended or adjusted under 35 U.S.C. 154(b) by 522 days.

(21) Appl. No.: 11/630,738

(22) PCT Filed: Jun. 9, 2005

(86) PCT No.: PCT/EP2005/052659
§ 371 (c)(1),
(2), (4) Date: Dec. 21, 2006

(87) PCT Pub. No.: WO2006/000528
PCT Pub. Date: Jan. 5, 2006

(65) Prior Publication Data
US 2009/0176497 A1    Jul. 9, 2009

(30) Foreign Application Priority Data
Jun. 28, 2004  (DE) .......................... 10 2004 031 132

(51) Int. Cl.
 H04W 36/00  (2009.01)
 H04W 24/00  (2009.01)
 H04W 4/00   (2009.01)
(52) U.S. Cl. .................... 455/440; 455/436; 455/456.1; 370/331

(58) Field of Classification Search .................... 370/331; 455/436, 440, 456.1
See application file for complete search history.

(56) References Cited

U.S. PATENT DOCUMENTS

| | | | |
|---|---|---|---|
| 7,143,171 B2 * | 11/2006 | Eriksson et al. | 709/227 |
| 2002/0059453 A1 | 5/2002 | Eriksson et al. | |
| 2002/0093923 A1 * | 7/2002 | Bouet | 370/328 |
| 2003/0193910 A1 * | 10/2003 | Shoaib et al. | 370/331 |

FOREIGN PATENT DOCUMENTS

| | | |
|---|---|---|
| EP | 1 014 742 A1 | 6/2000 |
| GB | 2 389 005 A | 11/2003 |
| GB | 2389005 A * | 11/2003 |
| WO | WO 02/39759 A2 | 7/2002 |

OTHER PUBLICATIONS

Agarwal et al., "On Scalability of Data Synchronization Protocols for PDAs and Mobile Devices", IEE network, vol. 16, No. 4, p. 1-14, Jul. 2002.*

* cited by examiner

*Primary Examiner* — Jinsong Hu
*Assistant Examiner* — Opiribo Georgewill
(74) *Attorney, Agent, or Firm* — Buchanan Ingersoll & Rooney PC

(57) ABSTRACT

According to a current user location, at least one favorable user location in the vicinity of a respective current user location for a mobile terminal is, as a suggestion for changing location, determined from communications requests for at least one respective application and from available network services in the vicinity of the current user location by virtue of the fact that, in favorable locations, network services can be more efficiently and/or economically used.

13 Claims, 1 Drawing Sheet

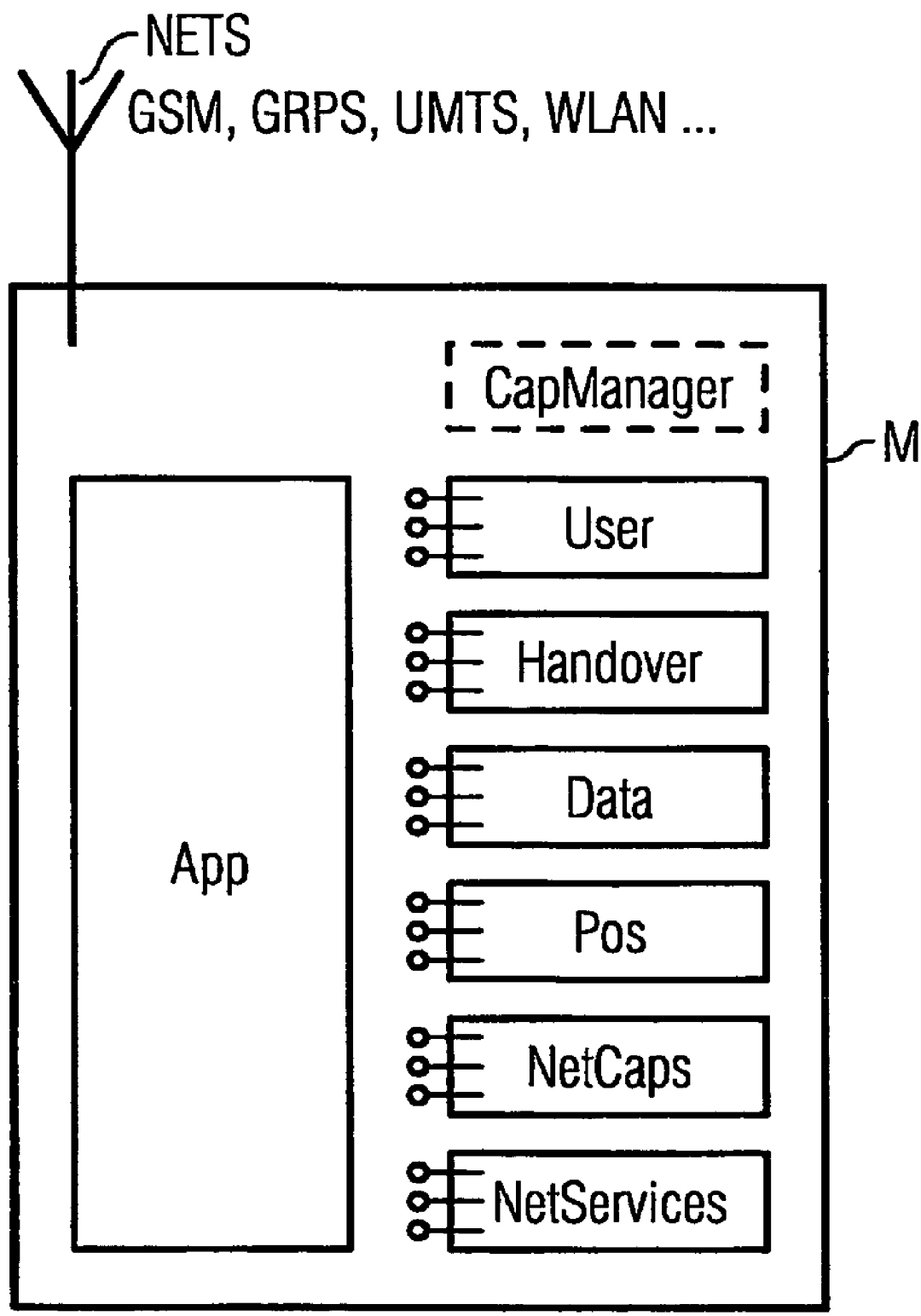

METHOD AND ARRANGEMENT FOR DETERMINING AT LEAST ONE SUGGESTION FOR A CHANGE OF LOCATION FOR A USER OF A MOBILE TERMINAL

CROSS REFERENCE TO RELATED APPLICATIONS

This application is the US National Stage of International Application No. PCT/EP2005/052659, filed Jun. 9, 2005 and claims the benefit thereof. The International Application claims the benefits of German application No. 102004031132.3 DE filed Jun. 28, 2004, both of the applications are incorporated by reference herein in their entirety.

FIELD OF INVENTION

The invention relates to a method and arrangement in which a favorable selection of a location with improved network access or possibly an associated change of location makes it possible for a user of a mobile terminal to use network services in a more efficient and/or more cost-effective way.

BACKGROUND OF INVENTION

Previously what is referred as a handover between different networks or parts of networks has occurred spontaneously, e.g. according to signal strength, and/or at the instigation of a user.

SUMMARY OF INVENTION

An underlying object of the invention now involves specifying a method and an arrangement for determining at least one suggestion for a change of location for a user of a mobile terminal so that it is made possible for him to use network services in a more efficient or more cost-effective way.

In accordance with the invention the object is achieved by the features of the independent claims. The dependent claims relate to advantageous embodiments of the method in accordance with the invention and to the inventive device.

The invention essentially involves, depending on a respective current user location, on communication requirements of at least one relevant application and on available network services in the vicinity of the current user location, determining at least one favorable user location in the vicinity of a relevant current user location for a mobile terminal as a suggestion for a change of location, with more efficient and more cost-effective use being able to be made of network services in favorable locations.

BRIEF DESCRIPTION OF THE DRAWING

The invention will be explained in greater detail below with reference to a sole drawing of an exemplary embodiment of a mobile terminal in accordance with the present invention.

DETAILED DESCRIPTION OF INVENTION

A mobile terminal M, through a built-in method or through services of a mobile radio network, provides the application App with an implementation of the following units or interfaces:

A unit or interface User, to inform the user of the terminal about a suggested change of location, for example via the display of the terminal.

A unit or interface Handover, with which a handover of the unit or interface Data mentioned below to another mobile radio network, e.g. from GSM to WLAN, can be initiated, or with which the terminal M can inform an application about such a handover.

A unit or interface Data, with which the application can exchange data with the Internet for example.

A unit or interface Pos, with which the application can determine the current geographical position of the terminal.

A unit or interface NetCaps, with which the application can request the characteristics of the mobile network currently able to be reached via the terminal M, for example its bandwidth, costs or quality-of-service characteristics.

A unit or interface NetServices, with which the application, depending on the current position of the user, can request the mobile user services available in the vicinity, for example. GSM, UMTS, WLAN, LAN, Bluetooth, locally or from a server, location information about these services as well as the capabilities of these network services.

The stated functionality of the stated interfaces can in this case be implemented locally at the terminal or in a distributed architecture at a number of terminals of the user and/or corresponding components (servers) in the network.

If the application App now wishes to perform a data transfer, it executes the following:

1. The application App uses the unit or interface NetCaps, to check whether the capabilities of a network available at the current location are sufficient for undertaking the data transfer. If necessary the application App requests via the unit or interface User a confirmation from the user, for example when the corresponding data transfer would be possible at the current location but would be very expensive.
2. If a change of location is necessary or desired, the application App requests via the unit or interface Pos the current position of the terminal, and then executes the following steps 3.8; if not it continues directly with step 6.
3. Using the unit or interface NetServices, the application App requests the network services possible in the vicinity and, depending on the requirements for the data transfer, possible preferences of the user etc., determines one or more locations to be suggested to the user as a new location.
4. The application App outputs these locations via the unit or interface User and suggests that the user move to a WLAN hotspot for example.
5. As soon as the user has reached this location or another suitable location, the application App recognizes this from the position information supplied on the unit or interface Pos and/or from the network services available via the unit or interface NetCaps.
6. The application App initiates via the unit or interface Handover a handover into the mobile radio network available at the new location with the desired capabilities or is informed by the unit or interface Handover by a built-in method of the terminal that such a handover has been undertaken.
7. The application App performs a data transfer using the unit or interface Data.

8. The application App informs the user via the unit or interface User after the end of the data transfer that he can leave the location, and where necessary causes a corresponding change of network via the unit or interface Handover.

Further especially advantageous embodiments of the invention are specified below:

The stated method is not executed by the individual applications but by a new component CapManager. The component CapManager collects the requirements of all applications with regard to data transfer, executes the above method and informs the application if a network service with the required capabilities is available.

The requirements regarding transmission capacity are not determined by the application App itself but by the mobile terminal, for example as a result of the protocol used, the number of bytes exchanged or further information derived from the specific protocols and exchanged messages. If the terminal recognizes that a more extensive data transfer may possibly have to be undertaken, it executes the above method autonomously and stops the corresponding applications for the appropriate length of time if necessary.

The above-mentioned method is integrated with a route planner or vehicle navigation system. This enables the planned route to be taken into account in step 3. Likewise a navigation system often has facilities for global positioning and can thus implement the above-mentioned unit or interface Pos. Similarly communication with the user can for example take place via the vehicle navigation system via the unit or interface User.

The unit or interface NetServices will as a rule be implemented using central directory services. In addition such a directory can be maintained in the mobile terminal itself. Information about locations, services and their characteristics is constantly entered into this directory, so that, in the course of time, information is collected about locations frequented by the user.

The method is implemented so that it can also work in off-line mode. In this case the directories needed are held in the terminal and the terminal then informs its user about the next WLAN hotspot even without a network connection.

The application App is executed on a server in the network and informs the terminal through a corresponding message, e.g. through an SMS, about an impending data transfer.

Instead of a precise geographical position, the position is determined roughly on the basis of characteristics of the data network currently used, for example on the basis of a GSM cell identification, a subnet mask of the IP network or on the basis of a MAC address or a network identification of a WLAN access point.

A further option is a peer-to-peer approach, in which information about locations, services and their characteristics is exchanged directly or via a server for example between mobile terminals.

The examples given here focus on wireless LANs, the stated methods can however easily be used to also direct a user for example into a UMTS cell with greater bandwidth. In such cases not only requirements of the end user but also requirements of the network operator are included in the method. For example it can be sensible for a network operator to direct an end user into a less heavily loaded network cell.

The stated invention can for example be implemented with a PocketPC, which has a built-in e-mail client, a GRPS connection, a GPS system and a WLAN card.

The e-mail client communicates with an e-mail server in the network and can request from the latter an e-mail to be loaded. If the size of the e-mail exceeds a certain threshold value, the e-mail client requests the position via the GPS system and submits an inquiry via GPRS to a server in the network, which returns a list of the WLAN access points in the immediate vicinity of the terminal. This list is suggested by the e-mail client to the user. The user can now decide whether to begin the download immediately—at higher cost for example—or whether to move to a location with WLAN access. As soon as WLAN access is established, the e-mail client recognizes this and begins to transmit the e-mail.

A typical example of an application of the invention is a mobile user who is on the move with his automobile and with a navigation system. An application in the communication system of the vehicle can assume a state in which the transmission of a larger data volume is sensible, e.g. the download of a large e-mail with attachments. However such a download is often only possible relatively slowly and/or at high cost using typical mobile radio networks such as GSM, and also UMTS.

The communication system can now use the navigation system to suggest to the driver of the vehicle to drive or to alter his route accordingly—he does not absolutely have to stay at this location—to a location at which a fast and low-cost download via wireless LAN (WLAN) is possible. After the driver has driven to such a hotspot, a faster and more cost-effective download of the e-mail is possible.

In this context it should be pointed out that the assumption is being made of a rapid growth of publicly accessible WLAN hotspots. For example Deutsche Telekom is looking into the idea of equipping public payphones with WLAN access points.

The invention claimed is:

1. A method for determining a change of location for a user of a mobile terminal, comprising:
   storing user service availability information comprised of service quality information, service capability information and service location information in a directory connected to the mobile terminal;
   exchanging or synchronizing service availability information with corresponding directories of other mobile terminals adjacent to the mobile terminal;
   checking the directory connected to the mobile terminal to determine whether a characteristics of a network available at a first location is sufficient to perform a data transfer under a requirement of the data transfer, wherein a requirement regarding transmission capacity is determined by the mobile terminal on the basis of a first criteria selected from the group consisting of a protocol used, a number of bytes exchanged, information derived from the protocol, an exchanged message, and combinations thereof;
   requesting a current position of the mobile terminal;
   determining if a change of location is desired, wherein in response to desiring the location change:
     requesting a network service possible in a vicinity according to a route plan,
     determining a plurality of first favorable locations such that the requirement and a service offering are weighted and optimized in regards to quality, costs and availability,
     determining at least one first favorable location from the plurality of first favorable locations based on (a) a second criteria selected from a group consisting of requirement for the data transfer, preference of the user, and combinations thereof, and (b) a third criteria selected from the group consisting of efficiency, cost-effectiveness, and combinations thereof, suggesting the at least one first favorable location to the user, and recognizing from a fourth criteria when the user has reached the first favorable location, the fourth criteria selected from the group consisting of location information, service available at the location and combinations thereof;

initiating a handover into a mobile radio network with the desired characteristic available at the first favorable location when necessary;

executing the data transfer; and informing the user about status of the data transfer, the status selected from the group consisting of beginning of the data transfer, progress of the data transfer, end of the data transfer, and combinations thereof.

2. The method as claimed in claim 1, wherein a confirmation is requested from the user when the corresponding data transfer is possible at the first location but would be expensive.

3. The method as claimed in claim 1, further comprising informing the user in response to the end of the data transfer that the user can leave the first favorable location.

4. The method as claimed in claim 1, wherein the current user location is determined approximately on the basis of a cell identification in the network, a subnet mask of the IP network or on the basis of a MAC address or a network identification of a WLAN access point.

5. The method as claimed in claim 1, wherein the current position of the user is entered manually or imported from an external system.

6. The method as claimed in claim 1, wherein available network services are requested from a central directory.

7. The method as claimed in claim 1, wherein directory is comprised of information about a newly visited location, a service of the newly visited location and a characteristic of the service of the newly visited location.

8. The method as claimed in claim 1, wherein the favorable location is a WLAN hotspot.

9. The method as claimed in claim 1, wherein a network available at the first location uses a different protocol to communicate with the terminal than a protocol used by the mobile radio network with the desired characteristic available at the first favorable location.

10. A device for determining a suggestion for a change of location for a user of a mobile terminal, the mobile terminal having an application, comprising:

a data exchange unit to exchange data with a current network;

a user information unit that informs a user of the mobile terminal about the suggested change of location;

a handover unit that initiates a handover of the unit for data exchange from the current network to another network and informs the application about the handover;

a position determining unit that determines a geographical position of the terminal and provides that position to the application;

a capability unit that determines a capability of the current network available to the application;

a service unit for determining a service available to the terminal in a vicinity of the terminal based on the position of the terminal, the service unit further determines a characteristic of the determined service, wherein a requirement regarding transmission capacity is determined by the mobile terminal on the basis of a first criteria selected from the group consisting of a protocol used, a number of bytes exchanged, information derived from the protocol, an exchanged message, and combinations thereof; and a directory unit, the directory unit configured to store user service availability information comprised of service quality information, service capability information and service location information on the mobile terminal, the directory unit configured to synchronize or exchange service availability information with service availability information stored by directory units of other mobile terminals;

the service unit, directory unit, capability unit, handover unit, data exchange unit and user information unit being configured such that each unit is connectable to at least one other unit;

wherein depending on the user location, in response to a communication requirement of the application and based on available network services in the vicinity of the user location as stored in the directory unit, (a) a plurality of favorable locations are determined such that the requirement and a service offering are weighted and optimized in regards to quality, costs and availability, and (b) a favorable location in the vicinity the user location is determined from the plurality of favorable locations for a mobile terminal at least in part based on (i) a second criteria selected from a group consisting of requirement for the data transfer, preference of the user, and combinations thereof, and (ii) a third criteria selected from the group consisting of efficiency, cost-effectiveness, and combinations thereof, the favorable location being suggested to the user via the user information unit.

11. The device as claimed in claim 10, further comprising a capability management interconnected to at least one other unit, wherein a requirement regarding the data transfer of application is collected and the capability management unit determines the suggestion for a change of location and informs the application if a network service with the requested capability is available.

12. The device as claimed in claim 10, further comprising a capability management unit, wherein a plurality of requirements regarding the data transfer for a plurality of applications in the terminal are collected and the capability management unit determines the suggestion for a change of location and informs the plurality of applications if a network service with the requested capabilities is available.

13. The device as claimed in claim 10, wherein for an impending substantial data transfer, the terminal is configured to perform the determination for a favorable location autonomously for a user and is configured to stop the corresponding applications until such time as the favorable location is reached.

\* \* \* \* \*